J. H. RUSSELL.
Wood-Planing Machines.

No. 156,104.  Patented Oct. 20, 1874.

WITNESSES:
E. Wolff
A. F. Terry

INVENTOR:
J. H. Russell
BY
ATTORNEYS.

UNITED STATES PATENT OFFICE.

JOHN H. RUSSELL, OF MILWAUKEE, WISCONSIN.

IMPROVEMENT IN WOOD-PLANING MACHINES.

Specification forming part of Letters Patent No. 156,104, dated October 20, 1874; application filed September 19, 1874.

*To all whom it may concern:*

Figure 1:
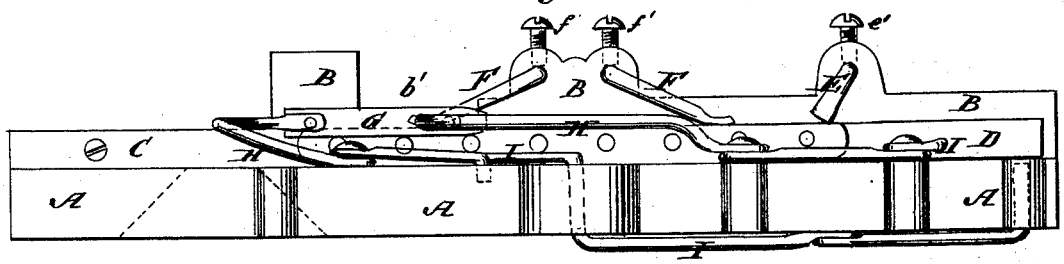
Figure 2:
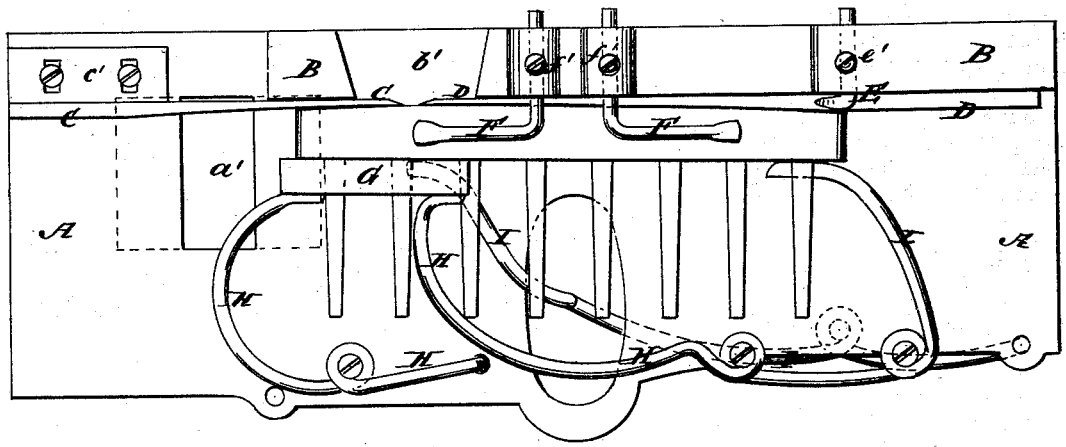

Be it known that I, JOHN H. RUSSELL, of Milwaukee, in the county of Milwaukee and State of Wisconsin, have invented a new and useful Improvement in Wood-Planing Machines, of which the following is a specification:

Figure 1 is an edge view of a planer-table, to which my improvement has been applied. Fig. 2 is a top view of the same.

Similar letters of reference indicate corresponding parts.

My invention has for its object to furnish an improved system of springs for attachment to planer and sticker tables, to enable rake-heads with tapering or arched backs and other different-shaped pieces of wood to be planed upon three or four sides at a time, and which will hold the wood to be planed firmly in place while being operated upon.

The invention consists in the system of springs when arranged in connection with the table, and guides of a planer or sticker for holding the work in place while being planed upon two or more sides at a time, as hereinafter described.

A represents the table of the planer, which is provided with a flange or strip, B, projecting at right angles. $a'$ represents an opening in the table A, through which the cutters that plane the lower side of the rake-head work. $b'$ is an opening in the strip or flange B, through which the cutters that plane back of the rake-head work. The upper cutters may be arranged in any convenient position above the rake-head. C D are guides, along which the back of the rake-head moves. The guide C is attached to the block $c'$, which is secured to the table A by screws or bolts, said screws or bolts passing through slots in the said block $c'$, so that the said guide C can be readily adjusted, as required. The guide D is placed in the angle between the table A and strip B, and is held in place adjustably by a hook-rod, E, the shank of which passes down through a slot in the strip or flange B, and is secured in place and pressed against the rake-head by a set-screw, $e'$. The back set of cutters works between the adjacent ends of the guides C D. The rake-head is held down upon the table A against the lower cutters by the springs F, the shanks of which are bent and passed through holes in the strip B, and are secured in place adjustably by set-screws $f'$. The rake-head is held against the back cutters, and the guides C D by the block G attached to the ends of the curved springs H, the shanks of which have eyes formed in them to receive the screws, by which they are secured to the table A. The shanks of the springs H may have two eyes formed in them to receive two holding-screws; or they may have one eye, and may have their ends bent at right angles to enter a hole in the table A, as may be desired. The block G rests against the front side of the rake-head, and the outer side of the rake-teeth, as shown in Figs. 1 and 2. The rake-teeth are held up against the pressure of the block G and springs H by the curved springs I, one of which passes through a hole in the table A, and is secured to the other side of said table. The other spring I is secured to the table A, and may be a continuation of one of the springs H. The springs H and I are so arranged as not to be in the way of the rake-head as it is fed forward. The rake-head is fed forward to the cutters in the ordinary way.

Having thus described my invention, what I claim as new, and desire to secure by Letters Patent, is—

The system of springs F G H I, when arranged in connection with the table A B and guides C D, of a planer or sticker for holding the work in place while being planed upon two or more sides at a time, substantially as herein shown and described.

JOHN H. RUSSELL.

Witnesses:
   JESSE C. SHEPARD,
   E. H. ROSS.